United States Patent Office 3,445,538
Patented May 20, 1969

3,445,538
PREPARATION OF OLEFINS
Samuel Kahn, Rutherford, N.J., assignor to Universal Oil Products Company, Des Plaines, Ill., a corporation of Delaware
No Drawing. Filed Sept. 21, 1966, Ser. No. 580,906
Int. Cl. C07c *11/08, 1/30*
U.S. Cl. 260—677                                    7 Claims

ABSTRACT OF THE DISCLOSURE

Preparation of 2,3-dimethylbutenes by dehydrohalogenation of 1-halo-3,3-dimethylbutane in a catalyst system containing a high boiling mineral oil boiling above 200° C. and a dehydrohalogenation catalyst of alumina at a temperature of from about 200° to about 350° C.

---

This invention relates to a process for the preparation of 2,3-dimethylbutenes and more particularly relates to a continuous process for preparing such olefins by the dehydrohalogenation and skeletal rearrangement of 1-halo-3,3-dimethylbutanes using a novel catalyst system.

The dehydrohalogenation and skeletal rearrangement of 1-halo-3,3-dimethylbutanes to produce 2,3-dimethylbutenes is a well-known reaction. Typically, it is effected by contacting the halobutanes with a dehydrohalogenation catalyst at elevated temperatures of from about 200° and, more usually, from about 300° to 500° C. This method of preparation suffers from a number of disadvantages, the foremost of which is that the yields and conversions are usually low and, in addition, the product that actually is obtained is usually accompanied by substantial amounts of by-products which make separation of the desired product both tedious and costly. It has now been discovered, however, that the continuous production of 2,3-dimethylbutenes may be simply and easily achieved with high yields and conversions and low by-product formation by effecting the dehydrohalogenation in the presence of a catalyst system comprising a mixture of a solid dehydrohalogenation catalyst and a high boiling inert fluid.

Accordingly, an object of this invention is to provide an improved process for preparing 2,3-dimethylbutenes. Another object is to provide a continuous process for preparing these olefins by effecting the dehydrohalogenation of 1-halo-3,3-dimethylbutanes in the presence of a novel catalyst system whereby the desired olefin product is readily obtained on a continuous basis with high yields and conversions and substantially free of by-products. A still further object is to provide a catalyst system for effecting the continuous dehydrohalogenation of 1-halo-3,3-dimethylbutanes. These and other objects of this invention will be apparent from the following further detailed description thereof.

The catalyst system which is used according to this invention to effect the continuous dehydrohalogenation of 1-halo-3,3-dimethylbutanes comprises a mixture or suspension of a solid dehydrohalogenation catalyst and an inert, high boiling fluid. This fluid is of critical importance to the success of the catalyst system in effecting the desired dehydrohalogenation and it is essential that this fluid be substantially inert to the halodimethylbutane reactant, the olefin products and the hydrogen halide formed during the reaction. It is also essential that this fluid have a boiling point above about the dehydrohalogenation temperature used. Of the various normally liquid materials having these two essential characteristics, as well as a desirable viscosity range, highly preferred materials for use in the catalyst system of this invention comprise mineral oils having atmospheric or normal boiling point ranges from above about 200° initial to 450° C. end and, more preferably, above about 350° initial to 500° C. end. The dehydrohalogenation catalyst used in the catalyst system may comprise any of the standard solid dehydrohalogenation catalysts used for converting 1-halo-3,3-dimethylbutanes to 2,3-dimethylbutenes and include such materials as aluminas or silica-aluminas, either alone or impregnated with materials such as alkaline earth metal halides, Friedel-Crafts type catalysts, or silicas activated with polyphosphoric acid. The results achieved will widely vary, however, depending upon the particular catalyst utilized in the system. A preferred catalyst for the system, especially when the fluid is a high boiling mineral oil, comprises a substantially pure alumina, for example, an alumina having at least above about 95 percent by weight as either beta trihydrate alumina or eta alumina, or a combination of both, with the remainder being primarily gamma alumina. The catalyst used should preferably be in a finely divided state so as to have a suitably large surface contacting area, and catalysts having, for example, a screen analysis of 35 percent through 200 mesh and 2 percent on 40 mesh are suitable.

The ratio of the fluid to catalyst in the catalyst system is not critical and may be widely varied. Generally, however, the ratio should, at least, be sufficient to provide a readily stirrable mixture with the particular minimum ratio for this purpose being dependent upon such factors as the particular catalyst used, its particle size and the particular fluid used. For example, when using a fluid such as a mineral oil and a catalyst such as a substantially pure alumina, the ratio of fluid to catalyst should, at least, be above about 1 weight part of fluid per one weight part of catalyst with a more preferred ratio being above about 3 to 1 or about 5 to 1 weight parts of fluid to catalyst, respectively. The upper limit of the ratio of fluid to catalyst is not too important. However, having high ratios of fluid to catalyst does not necessarily improve the results of the process, and primarily serves only to increase the volume of the catalyst system, thus raising the overall process cost. Typically, a satisfactory upper limit for the ratio is about 7.5 weight parts of fluid per one weight part of catalyst. The quantity of the catalyst system used in the process will be primarily determined by the quantity of solid catalyst present in the system and the particular ratio of fluid to catalyst chosen for the system. The quantity of catalyst present in the system, in turn, will be dependent upon such variable factors as the charge rate of the 1-halo-3,3-dimethylbutane, the particular catalyst used, the temperature and the degree of conversion desired. For example, when using a substantially pure alumina as the catalyst and a mineral oil as the fluid in the catalyst system, a quantity of catalyst proportional to a range of from about 0.1 to 3 weight parts of catalyst per one weight part of the halodimethylbutane charge per hour will be satisfactory for most operating conditions. The dehydrohalogenation conditions of temperature and pressure used to effect the dehydrohalogenation are not critical and may be widely varied with the optimum dehydrohalogenation temperature for maximizing yield and conversion being dependent upon such factors as the particular catalyst system used and the charge rate of the 1-halo-3,3-dimethylbutane. Generally, a temperature ranging from about 200° to 350° C. may be satisfactorily used. Contrary to prior dehydrohalogenations, however, which usually required temperatures above 300° to obtain acceptable conversions, highly satisfactory results may be obtained according to this invention by operating at relatively low temperatures within the range of from about 220° to 275° C. and, more specifically, about 245° to 250° C. This low temperature operation renders the process particularly desirable inasmuch as the problems usually associated with high temperature operation above 300° C., such as destruction of product and catalyst deactivation are thus avoided. The pressure used in association with the above temperature ranges may be varied but, conveniently, atmospheric pressures may be suitably utilized in most instances. The rate at which the 1-halo-3,3-dimethylbuttane is contacted with the catalyst system may be varied and the particular rate chosen to optimize the conversion will depend upon such factors as the temperature, the particular catalyst system, its volume, and the quantity of dehydrohalogenation catalyst present in the system. For example, when using an alumina catalyst and a mineral oil in the catalyst system, a 1-halo-3,3-dimethylbutane charge rate ranging from about 0.1 to 5 pounds per hour per pound of catalyst usually will be satisfactory. The 1-halo-3,3-dimethylbutane used as the starting material may comprise either the 1-chloro or 1-bromo compounds. The results generally are improved, however, when the 1-chloro compound, namely neohexyl chloride, is used as the starting material and, for this reason, it is the preferred 1-halo-3,3-dimethylbutane reactant for use in the process of this invention. While it is preferred to use a fresh charge of the halodimethylbutane in the process of this invention, it is also possible to use the halodimethylbutane recovered from the product as a recycle. This recycle, which is permitted by virtue of the extremely high selectivity of the catalyst system to convert the charge primarily to the desired product without the concomitant formation of substantial quantities of by-product, renders the process most economical. The 2,3-dimethylbutenes produced by the process of this invention usually exist as a mixture of the 1 and 2 isomers which, if desired, may be separated from each other by conventional techniques including fractionation.

One illustrative procedure for carrying out the process of this invention for preparing 2,3-dimethylbutenes comprises continuously charging, at an appropriate rate, a 1-halo-3,3-dimethylbutane, for example neohexyl chloride, to a suitable reactor maintained at the desired temperature and pressure and containing the catalyst system comprising a stirred mixture of a solid dehydrohalogenation catalyst, for example an alumina, and an inert, high boiling fluid such as a mineral oil which are maintained in the desired weight ratio. The gaseous product effluent is continuously withdrawn from the reactor and passed to a condenser maintained at a suitable temperature. The gaseous fraction from the condenser comprising primarily the hydrogen halide formed in the reaction is passed to a water scrubber to remove any residual liquid products which may then be combined with the liquid fraction from the condenser. The combined liquid fraction is charged to a suitable fractionator to separate the desired 2,3-dimethylbutenes from by-products and from the neohexyl chloride starting material. Because of the high efficiency of the catalyst system in producing high yields of 2,3-diemthylbutenes without the usual formation of substantial quantities of by-products, the recovered starting material, in this illustration neohexyl chloride, may be recycled to the reactor as the charge or a part thereof.

The following examples are offered to illustrate the process of this invention and the catalyst system therefor. They are not intended, however, to limit the invention to the specific reactants, conditions or catalyst system described therein.

EXAMPLE I

The dehydrohalogenation of a 1-halo-3,3-dimethylbutane using the process and catalyst system of this invention may be illustrated by the following procedure:

A glass-lined reactor, equipped with mixing and heating means and distillation overhead with a condenser, was filled with a catalyst system comprising 1000 grams of a colorless mineral oil having an atmospheric boiling range of 367° C. start and 500° C. end and 200 grams of a finely divided, substantially pure alumina containing at least 95 percent by weight as beta trihydrate alumina or eta alumina, with the remainder being primarily gamma alumina. With stirring, the catalyst system was heated to a temperature of about 245° C. to 250° C. A stream of neohexyl chloride (98.5 percent) was then continuously passed into the vessel and contacted therein with the catalyst system while maintaining the above temperature range. The vaporous material leaving the vessel was passed through the condenser and the liquid condensate was collected. The gaseous material leaving the condenser, comprising mostly hydrogen chloride, was charged to a water scrubber and any residual liquid condensate recovered therein from the gaseous materials was combined with the liquid condensate. The run was continued for a period of about 35 hours during which time a total of about 20,959 grams of fresh neohexyl chloride were charged at a rate averaging approximately 10 grams per minute. The collected liquid condensate was distilled to recover the following components in the indicated amounts:

| | Grams |
|---|---|
| 2,3-dimethylbutene-1 (28.7 mols) | 2410 |
| 2,3-dimethylbutene-2 (77.0 mols) | 6460 |
| Neohexene (3.07 mols) | 258 |
| Methyl pentenes (4.24 mols) | 356 |
| Impurities | 128 |
| Neohexyl chloride (55.3 mols) | 6664 |

The conversion to 2,3-dimethylbutenes was accordingly 61.5 percent and the yield based upon consumed neohexyl chloride was 91 percent of theory.

EXAMPLE II

To illustrate the high selectivity of the catalyst system in converting the charge primarily to 2,3-dimethylbutenes without the usual formation of substantial quantities of contaminating impurities, the neohexyl chloride fraction recovered from the product fraction of Example I was used as the neohexyl chloride charge in another run without further purification. The conditions and procedures were substantially the same as in Example I and the conversion of 2,3-dimethylbutenes obtained was 62.3 percent of theory and the yield obtained based upon consumed neohexyl chloride was 80 percent of theory.

I claim as my invention:

1. A continuous process for preparing 2,3-dimethylbutenes which comprises contacting 1-halo-3,3-dimethylbutane at dehydrohalogenation conditions of a temperature of from about 200° to 350° C. with a catalyst system containing a mineral oil in liquid phase, said mineral oil having an atmospheric boiling point above about 200° C. and an alumina dehydrohalogenation catalyst in a weight ratio of above about 1 to 1, respectively, separating the resultant product mixture from the catalyst system and thereafter recovering the desired 2,3-dimethylbutenes.

2. The process of claim 1 effected at atmospheric pressure.

3. The process according to claim 1 characterized in that the 1-halo-3,3-dimethylbutane is 1-chloro-3,3-dimethylbutane.

4. The process according to claim 1 characterized in that the dehydrohalogenation catalyst is a substantially pure alumina.

5. The process according to claim 1 characterized in that the temperature ranges from about 220° to 275° C.

6. The process according to claim 1 characterized in that the catalyst system is a mixture of a mineral oil having an atmospheric boiling point above about 350° C. and an alumina catalyst in a weight ratio above about 3 parts of oil per one part of alumina.

7. The process according to claim 6 characterized in that the alumina catalyst comprises a substantially pure alumina composed primarily of an alumina selected from the group consisting of eta alumina, betatrihydrate alumina and mixtures thereof.

References Cited

UNITED STATES PATENTS

| 2,404,927 | 7/1946 | Schmerling et al. | 260—676 |
| 3,227,770 | 1/1966 | Burk et al. | 260—677 |
| 1,384,423 | 7/1921 | Bielouss | 260—677 |

DELBERT E. GANTZ, *Primary Examiner.*

J. D. MYERS, *Assistant Examiner.*